US007777820B2

(12) United States Patent
Kim (10) Patent No.: US 7,777,820 B2
(45) Date of Patent: Aug. 17, 2010

(54) ARRAY SUBSTRATE AND DISPLAY APPARATUS HAVING THE SAME

(75) Inventor: Dong-Gyu Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 223 days.

(21) Appl. No.: 11/849,130

(22) Filed: Aug. 31, 2007

(65) Prior Publication Data

US 2008/0062108 A1  Mar. 13, 2008

(30) Foreign Application Priority Data

Sep. 7, 2006  (KR) ............. 10-2006-0085997

(51) Int. Cl.
*G02F 1/1343* (2006.01)
(52) U.S. Cl. ............. 349/38; 349/39; 349/48; 345/92
(58) Field of Classification Search ............ 349/38, 349/39, 43
See application file for complete search history.

(56) References Cited

U.S. PATENT DOCUMENTS

| | | | | |
|---|---|---|---|---|
| 6,014,190 | A * | 1/2000 | Kim et al. ............. | 349/39 |
| 2002/0018035 | A1 | 2/2002 | Song et al. | |
| 2003/0174258 | A1* | 9/2003 | Yun et al. ............. | 349/38 |
| 2004/0114059 | A1* | 6/2004 | Lee et al. ............. | 349/39 |
| 2005/0036091 | A1* | 2/2005 | Song ............. | 349/129 |
| 2006/0215066 | A1* | 9/2006 | Ueda et al. ............. | 349/38 |
| 2007/0046567 | A1 | 3/2007 | Ha | |

FOREIGN PATENT DOCUMENTS

| | | |
|---|---|---|
| JP | 8-146465 | 6/1996 |
| JP | 2006-133577 | 5/2006 |
| JP | 1773355 | 5/2006 |
| KR | 10-2006-0014726 | 2/2006 |

OTHER PUBLICATIONS

Patent Abstracts of Japan, Publication No. 08146465m Jun. 7, 1996, 1 p.
Patent Abstracts of Japan, Publication No. 2006133577, May 25, 2006, 1 p.
Examination report corresponding to EP 07017276.2-2205, Mar. 1, 2010, 3 pages.

* cited by examiner

*Primary Examiner*—David Nelms
*Assistant Examiner*—Thanh-Nhan P Nguyen
(74) *Attorney, Agent, or Firm*—Innovation Counsel LLP (57) ABSTRACT

An array substrate includes a first thin-film transistor (TFT), a second TFT, a first pixel electrode, a second pixel electrode and a storage line. The first TFT is electrically connected to a gate line and a data line. The second TFT is electrically connected to the gate and data lines. The first pixel electrode is electrically connected to the first TFT. The second pixel electrode is electrically connected to the second TFT. The storage line is positioned in an overlapping relationship with the first and second pixel electrodes. The overlap defines a first area of the storage line associated with the first pixel electrode, and a second area of the storage line associated with the second pixel electrode. Therefore, different voltages are applied to the first and second pixel electrodes, so that a viewing angle may be enhanced.

24 Claims, 7 Drawing Sheets

ARRAY SUBSTRATE AND DISPLAY APPARATUS HAVING THE SAME

CROSS-REFERENCE TO RELATED APPLICATIONS

This application claims priority under 35 U.S.C. §119 to Korean Patent Application No. 10-2006-85997, filed on Sep. 7, 2006 in the Korean Intellectual Property Office (KIPO), the contents of which are herein incorporated by reference in their entirety.

BACKGROUND OF THE INVENTION

1. Field of the Invention

The present invention relates to an array substrate and a display apparatus having the array substrate. More particularly, the present invention relates to an array substrate capable of enhancing a viewing angle and a display apparatus having the array substrate.

2. Description of the Related Art

Generally, a liquid crystal display (LCD) apparatus is a flat display apparatus displaying an image using light transmissivity of liquid crystal, and the LCD includes an LCD panel displaying the image using the light and a backlight assembly applying the light to the LCD panel.

The LCD panel includes an array substrate, a color filter substrate facing the array substrate, and a liquid crystal layer disposed between the array substrate and the color filter substrate. The array substrate includes gate lines, data lines crossing the gate line, a pixel electrodes formed in a unit pixel that is defined by the gate and data lines, and a thin-film transistor (TFT) electrically connected to the gate and data lines for applying a driving voltage to the pixel electrode. The color filter substrate includes a color filter and a common electrode.

The LCD panel may be driven by a twisted nematic (TN) mode, a vertical alignment (VA) mode, an in-plane switching (IPS) mode or another mode, according to an arrangement direction of liquid crystal molecules in the liquid crystal layer. For example, an LCD panel driven by a patterned vertical alignment (PVA) mode, which is a type of VA mode, has been recently developed. In the PVA mode, the pixel electrode and the common electrode are patterned on the LCD panel, for enhancing a viewing angle.

The LCD panel employing the PVA mode may have a wider viewing angle than the LCD panel driven by other modes. However, since a single voltage is applied to the pixel electrode formed in the unit pixel, the LCD panel having the PVA mode has a basic limitation as to how much the viewing angle can be enlarged.

SUMMARY OF THE INVENTION

The present invention provides an array substrate enhancing a viewing angle.

The present invention also provides a display apparatus having the array substrate.

In an example array substrate according to the present invention, the array substrate includes a first thin-film transistor (TFT), a second TFT, a first pixel electrode, a second pixel electrode and a storage line.

The first TFT is electrically connected to a gate line and a data line. The second TFT is electrically connected to the gate and data lines. The first pixel electrode is electrically connected to the first TFT. The second pixel electrode is electrically connected to the second TFT. The storage line is positioned in an overlapping relationship with the first and second pixel electrodes. The overlap defines a first area of the storage line associated with the first pixel electrode, and a second area of the storage line associated with the second pixel electrode. A magnitude of the first area is different from a magnitude of the second area.

In this case, a gate electrode and a source electrode of the first TFT are electrically connected to a gate electrode and a source electrode of the second TFT, respectively.

The magnitude of the first area may be larger than the magnitude of the second area. For example, the first area is twice as large as the second area.

In an example display apparatus according to the present invention, the display apparatus includes an array substrate, a counter substrate facing the array substrate, a liquid crystal layer disposed between the array substrate and the counter substrate, and a driving unit electrically connected to the array substrate.

The array substrate includes a first TFT electrically connected to a gate line and a data line crossing each other, a second TFT electrically connected to the gate and data lines, a first pixel electrode electrically connected to the first TFT, a second pixel electrode electrically connected to the second TFT, and a storage positioned in an overlapping relationship with the first and second pixel electrodes. The overlap defines a first area of the storage line associated with the first pixel electrode, and a second area of the storage line associated with the second pixel electrode. A magnitude of the first area is different from a magnitude of the second area.

A plurality of gate lines is formed in a first direction, and a plurality of data lines is formed in a second, different direction from the first direction thereby forming a plurality of pixel unit areas. The first and second pixel electrodes are formed in each pixel unit area.

Alternatively, the storage line may include a first storage branch line and a second storage branch. The first storage branch line overlaps first and second pixel electrodes that are disposed in odd-numbered rows of the first and second pixel electrodes. The second storage branch overlaps first and second pixel electrodes that are disposed in even-numbered rows of the first and second pixel electrodes.

The array substrate may further include a first storage main line, and a second storage main line. The first storage main line is electrically connected to an end portion of the first storage branch line. The second storage main line is electrically connected to an end portion of the second storage branch line. The first storage voltage generator is coupled to the first storage main line and the second storage voltage generator is coupled to the second storage main line.

The driving unit may include a first storage voltage generating part for generating a first storage voltage and applying the first storage voltage to the first storage main line, and a second storage voltage generating part for generating a second storage voltage different from the first storage voltage and applying the second storage voltage to the second storage main line.

The first and second storage voltages include rectangular waves that vibrate with predetermined amplitude. The first and second storage voltages may include the rectangular waves that have the same amplitude but have reversed phases.

According to the present invention, the storage line is overlapped with the first and second pixel electrodes that are separably formed in the unit pixel, having different areas from each other, so that different voltages are applied to the first and second pixel electrodes. Thus, a viewing angle of the display apparatus may be enhanced.

BRIEF DESCRIPTION OF THE DRAWINGS

The above and other features and advantages of the present invention will become more apparent in light of the following detailed descriptions of several example embodiments thereof with reference to the accompanying drawings, in which.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the is other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
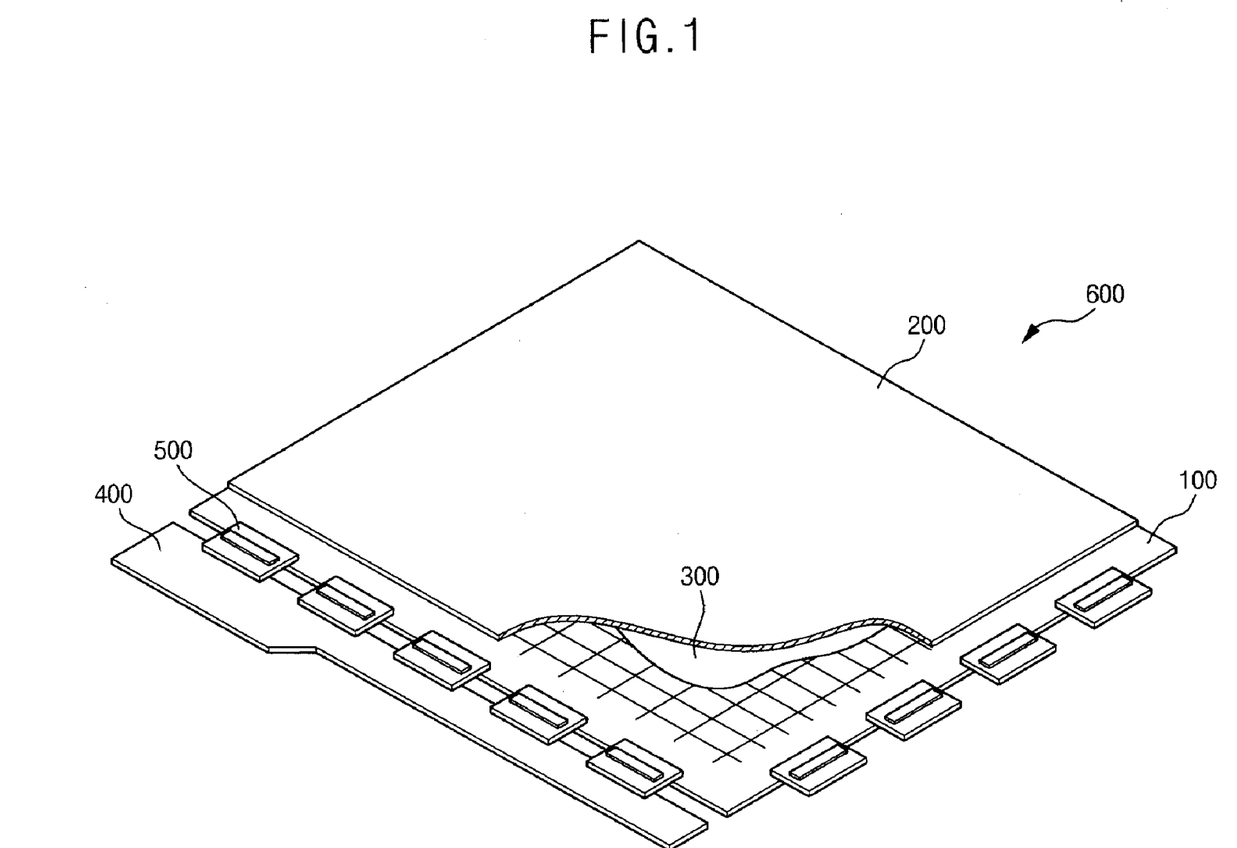
FIG. 1 is a perspective view illustrating a display apparatus according to an example embodiment of the present invention.

FIG. 1 is a perspective view illustrating a display apparatus according to an example embodiment of the present invention.

Referring to FIG. 1, the display apparatus 600 according to the present example embodiment includes an array substrate 100, a counter substrate 200, a liquid crystal layer 300, a printed circuit board (PCB) 400 and a flexible PCB (FPCB) 500, and displays an image using light.

The array substrate 100 includes a plurality of pixel electrodes arranged in a matrix shape, a plurality of thin-film transistors (TFTs) for applying a driving voltage to the pixel electrodes, and a plurality of signal lines for operating the TFTs.

The counter substrate 200 is disposed to face the array substrate 100. The counter substrate 200 may selectively include a plurality of color filters disposed to face the pixel electrodes. For example, the color filters typically include a red color filter, a green color filter, and a blue color filter.

The liquid crystal layer 300 is disposed between the array substrate 100 and the counter substrate 200, and the liquid crystal molecules are rearranged by an electric field generated between the pixel electrode and the common electrode. The rearranged liquid crystal layer 300 controls light transmissivity of light incident from an exterior, and the light passes through the color filters to display an image.

The PCB 400 is electrically connected to the array substrate 100, and supplies a driving signal to the array substrate. The PCB 400 may include a data PCB and a gate PCB.

The FPCB 500 electrically connects the PCB 400 with the array substrate 100 to supply the driving signal generated by the PCB 400 to the array substrate 100. For example, the FPCB 500 may include a tape carrier package (TCP) or a chip-on-film (COF).

The gate PCB of the PCB 400 may be eliminated by forming an additional signal line on the array substrate 100 and the FPCB 500. FIG. 1 illustrates the display apparatus eliminating the gate PCB.

Figure 2:
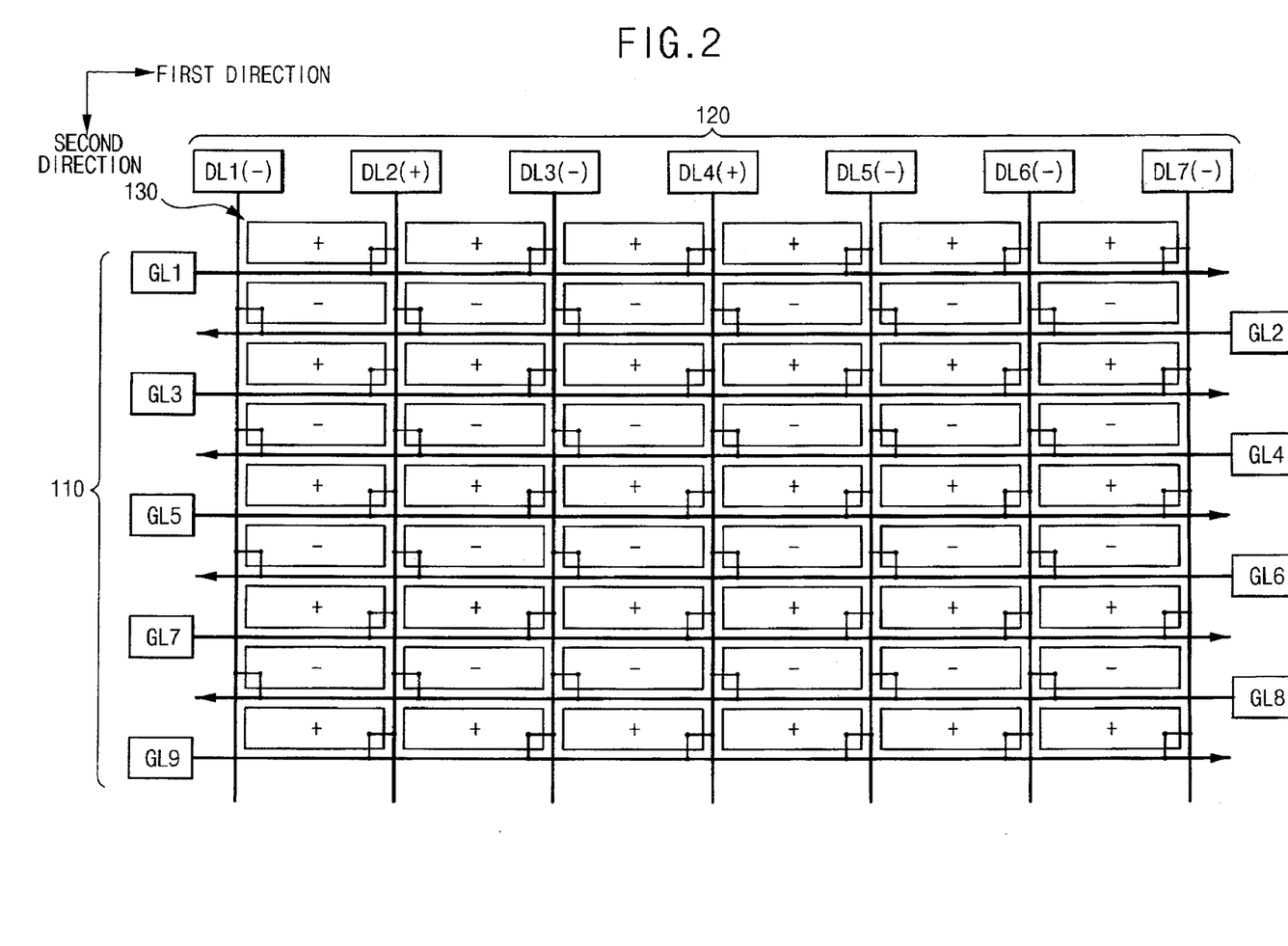
FIG. 2 is a plan view illustrating an arrangement of the array substrate of the display apparatus in FIG. 1.

FIG. 2 is a plan view illustrating an arrangement of an array substrate of the display apparatus in FIG. 1.

Referring to FIG. 2, the array substrate 100 includes a plurality of gate lines 110, a plurality of data line 120 and a plurality of pixel portions 130. In this case, each pixel portion 130 includes a TFT electrically connected to the gate and data lines 110 and 120, and the pixel electrode electrically connected to the TFT.

A plurality of gate lines 110 is formed along a first direction, and a plurality of data lines 120 is formed along a second direction substantially perpendicular to the first direction. For example, nine gate lines GL1 to GL9 and seven data lines DL1 to DL7 are illustrated in FIG. 2. The gate lines GL1 to GL9 are electrically connected to a gate driving part (not shown) to receive gate signals. The data lines DL1 to DL7 are electrically connected to a data driving part (not shown) to receive data signals.

Since the gate lines GL1 to GL9 and the data lines DL1 to DL7 are formed substantially perpendicular to each other, a plurality of unit pixels is defined in the array substrate 100. The pixel portion 130 is formed in each unit pixel, so that a plurality of pixel portions 130 is arranged in the array substrate 100 in a matrix shape.

For example, each unit pixel has a rectangular shape, and relatively longer edges of the rectangular shape are formed along the first direction. Thus, relatively longer edges of the pixel portion 130 that is formed in the unit pixel, are also formed along the first direction.

The TFTs in the pixel portion 130 are sequentially formed along the second direction at left and right sides of one of the data lines 120, and are electrically connected to one of the data lines 120. For example, the TFTs may be disposed along the second direction in the order of left, right, left, right, etc. sides of one of the data lines 120, or in the order of right, left, right, left, etc. sides of one of the data lines 120. In FIG. 2, the TFTs are sequentially configured along the second direction in the order is of left, right, etc. sides of one of the data lines 120.

For example, the data line DL1 disposed at the outermost end of the left side among the data lines DL1 to DL7 is electrically connected to the pixel portions 130 at even-numbered rows. The data line DL7 configured at the outermost end of the right side among the data lines DL1 to DL7 is electrically connected to the pixel portions 130 at odd-numbered rows. The data lines DL2 to DL6 are electrically connected to the pixel portions 130, being sequentially configured at left and right sides along the second direction.

For example, the data signal is applied to each data lines DL1 to DL7, for a vertical inversion. For example, during one frame, the data signal having a positive (+) voltage is applied to the fourth data line DL4, and the data signal having a negative (−) voltage is applied to the third and fifth data lines DL3 and DL5 adjacent to the fourth data line DL4. During the next frame, the data signal having the negative (−) voltage is applied to the fourth data line DL4, and the data signal having the positive (+) voltage is applied to the third and fifth data lines DL3 and DL5. Thus, each pixel electrode of the pixel portions 130 does a dot inversion at every frame.

Figure 3:
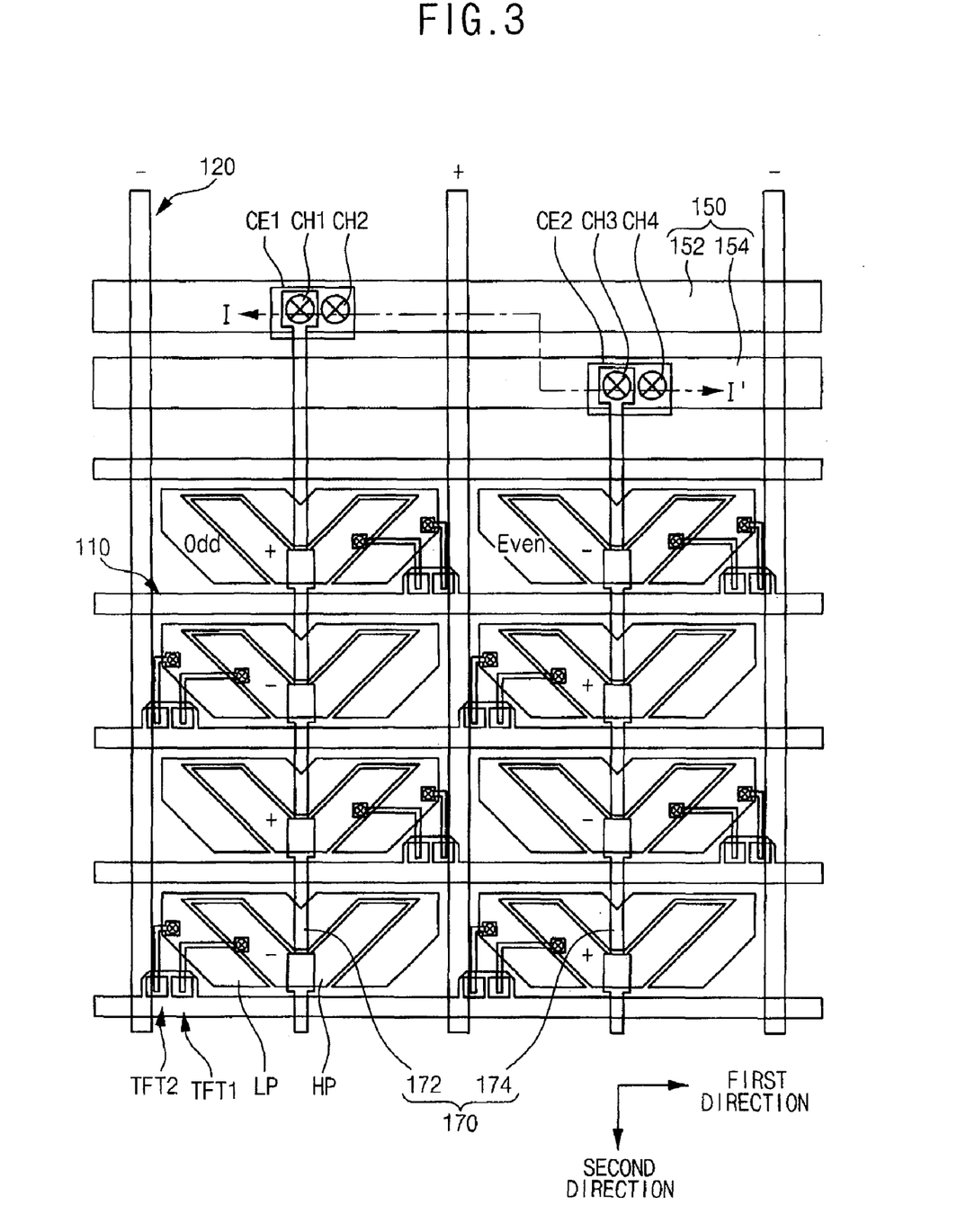
FIG. 3 is a partially enlarged plan view of a portion of FIG. 2.
Figure 4:
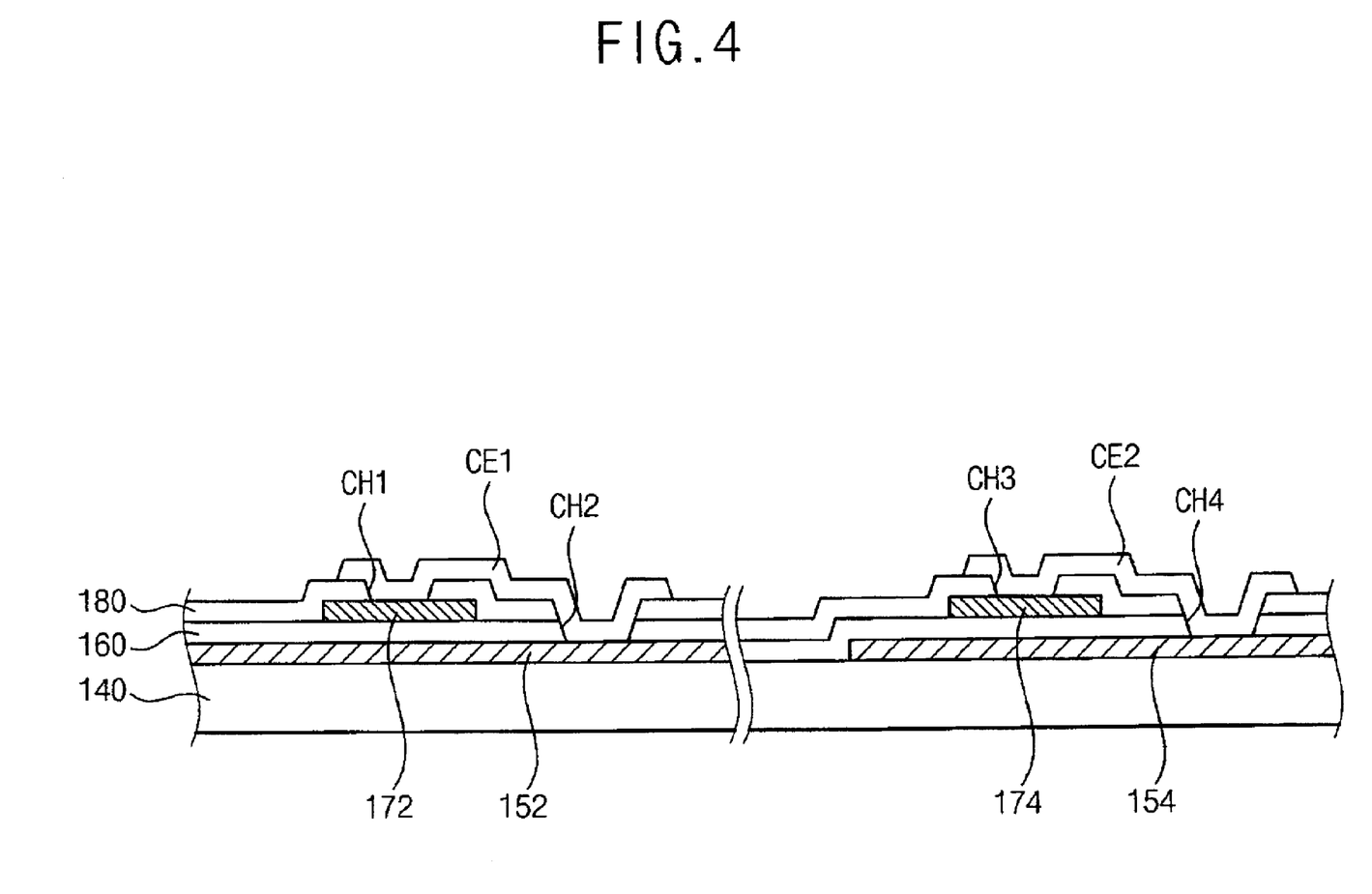
FIG. 4 is a cross-sectional view taken along a line I-I' in FIG. 3.

FIG. 3 is an enlarged plan view of a portion of FIG. 2, and FIG. 4 is a cross-sectional view taken along a line I-I' in FIG. 3.

Referring to FIGS. 3 and 4, the array substrate 100 includes a transparent substrate 140, a gate line 110, a storage trunk line 150, a first insulating layer 160, a data line 120, a storage branch line 170, a first TFT TFT1, a second TFT TFT2, a second insulating layer 180, a first pixel electrode HP, a second pixel electrode LP, a first connecting electrode CE1 and a second connecting electrode CE2.

The transparent substrate 140 has a plate shape, and includes a transparent material. For example, the transparent substrate 140 may include glass, quartz and transparent synthetic resin.

The gate line 110 is formed on the transparent substrate 140 along the first direction, and a plurality of gate lines is formed in parallel along the second direction.

The storage trunk line 150 is formed on the transparent substrate 140 parallel with the gate line 140. The storage trunk line 150 is separated from the gate line 140 along the second direction by a predetermined distance. For example, the storage trunk line 150 is formed at an upper side of the gate line 140.

The storage trunk line 150 includes a first storage main line 152 and a second storage main line 154. The first and second storage main lines 152 and 154 are separated from each other along the second direction, and are parallel with each other. In this case, the first storage main line 152 receives a first storage voltage, and the second storage main line 154 receives a second storage voltage.

The first insulating layer 160 is formed on the transparent substrate 140, for covering the gate line 110 and the storage trunk line 150 which includes the first storage main line 152 and the second storage main line 154. In this case, the first insulating layer 160 may include silicon nitride (SiNx) or silicon oxide (SiOx).

The data line 120 is formed on the first insulating layer 160 along the second direction, to cross the gate line 110. A plurality of data lines 120 is formed along the first line. Since the plurality of gate lines 110 and data lines 120 cross each other, the plurality of unit pixels is defined. The unit pixels are formed in the matrix shape, when viewed on a plane.

The storage branch line 170, which includes storage branch lines 172 and 174, is formed on the first insulating layer 160 parallel with the data line 120. A plurality of storage trunk lines, such as trunk lines 152 and 154, is formed along the first direction. As shown in FIG. 3, the storage branch lines 172 and 174 are formed between adjacent data lines 120. The storage branch lines 172 and 174 may be formed in the center of the region between the adjacent data lines 120.

The storage branch line 170 which includes storage branch lines 172 and 174, as well as other storage branch lines not shown, are electrically connected to the storage trunk line 150, which includes the first storage main line 152 and the second storage main line 154.

The first storage branch line 172 is formed to cross the unit pixels formed at the odd-numbered rows. An end portion of the first storage branch line 172 is electrically connected to the first storage main line 152.

The second storage branch line 174 is formed to cross the unit pixels formed at the even-numbered rows. An end portion of the second storage branch line 174 is 1o electrically connected to the second storage main line 154.

The first TFT TFT1 and the second TFT TFT2 are formed in the unit pixels. The first TFT TFT1 and the second TFT TFT2 are electrically connected to the gate and data lines 110 and 129. The first TFT TFT1 and the second TFT TFT2 are sequentially formed along the second direction at the left and right sides of one of the data lines 120.

The second insulating layer 180 is formed on the first insulating layer 160, for covering the data line 120, the storage branch line 170, the first TFT TFT1 and the second TFT TFT2. In this case, the second insulating layer 180 may include SiNx or SiOx like the first insulating layer 160.

The first pixel electrode HP and the second pixel electrode LP are formed in the unit pixels. The first and second pixel electrodes HP and LP include transparent conductive materials such as indium tin oxide (ITO), indium zinc oxide (IZO), and amorphous indium tin oxide (a-ITO).

The first pixel electrode HP is electrically connected to the first TFT TFT1, and receives a first driving voltage from the first TFT TFT1 with which to be charged. The first pixel electrode HP is partially overlapped with the storage branch line 172. The first pixel electrode HP may have a symmetric shape on the basis of the storage branch line 172 disposed in the center of the region between the adjacent data lines 120.

The second pixel electrode LP is electrically connected to the second TFT TFT2, and receives a second driving voltage from the second TFT TFT2 with which to be charged. The second pixel electrode LP is separated from the first pixel electrode HP by a predetermined distance. As shown in FIG. 3, the second pixel electrode LP may have a shape enclosing the first pixel electrode HP. As viewed in FIG. 3, second pixel electrode LP is "M"-shaped. In this case, an area of the second pixel electrode LP may be larger than that of the first pixel electrode HP, and for example, the area of the second pixel electrode LP is twice as large as that of the first pixel electrode HP.

The second pixel electrode LP is partially overlapped with the storage branch line 172. The second pixel electrode LP may have a symmetric shape on the basis of the storage branch line 172 disposed in the center of the region between the adjacent data lines 120.

As shown in FIG. 4, the first connecting electrode CE1 is formed on the second insulating layer 180, and electrically connects the first storage branch line 172 with the first storage main line 152 through a first contact hole CH1 and a second contact hole CH2.

In this case, the first contact hole CH1 is formed at the second insulating layer 180 for exposing the end portion of the first storage branch line 172, and the second contact hole CH2 is formed at the first and second insulating layers 160 and 180 for exposing a portion of the first storage main line 152.

The second connecting electrode CE2 is formed on the second insulating layer 180, and electrically connects the second storage branch line 174 with the second storage main line 154 through a third contact hole CH3 and a fourth contact hole CH4.

In this case, the third contact hole CH3 is formed at the second insulating layer 180, for exposing the end portion of the second storage branch line 174, and the fourth contact hole CH4 is formed at the first and second insulating layers 160 and 180, for exposing a portion of the second storage main line 154.

Figure 5:
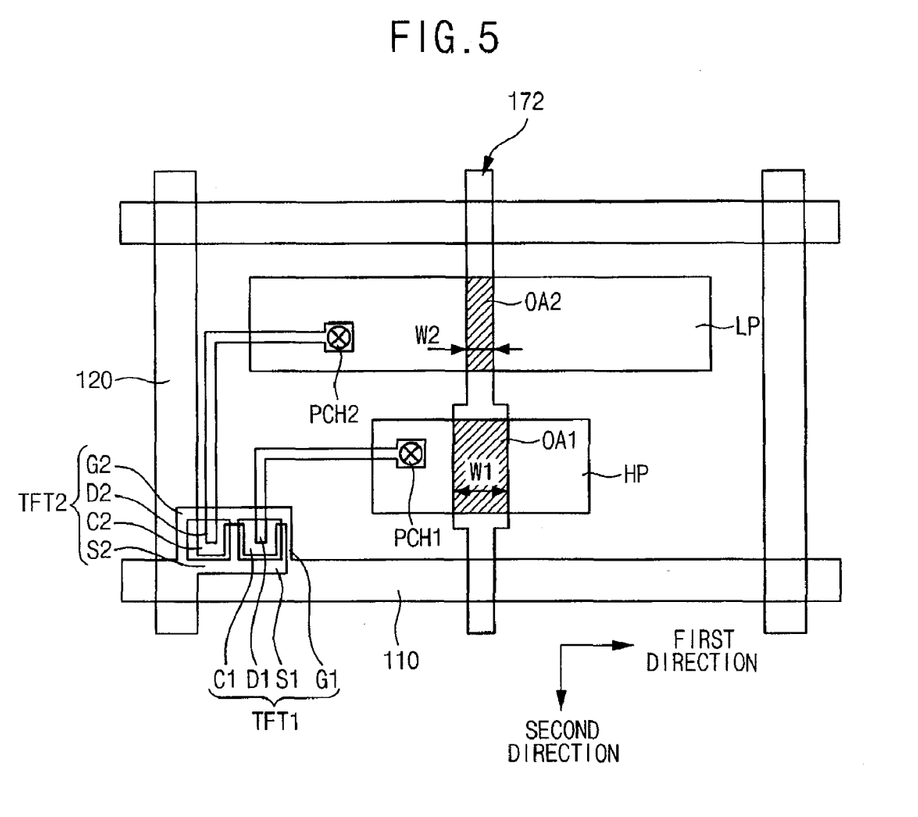
FIG. 5 is a plan view illustrating a simplified layout of unit pixel in FIG. 3 provided for explanatory purposes.

FIG. 5 is a plan view illustrating in simplified form a unit pixel in FIG. 3.

Referring to FIG. 5, the first TFT TFT1, the second TFT TFT2, the first pixel electrode HP, the second pixel electrode LP and the storage branch line 170 are explained in detail.

The first TFT TFT1 includes a first gate electrode G1, a first channel pattern C1, a first source electrode S1 and a first drain electrode D1. The second TFT TFT2 includes a second gate electrode G2, a second channel pattern C2, a second source electrode S2 and a second drain electrode D2.

The first and second gate electrodes G1 and G2 are formed by protrusions from the gate line 110 along the second direction by a predetermined distance. The first and second gate electrodes G1 and G2 are electrically connected to each other.

The first channel pattern C1 is correspondingly formed on the first insulating layer 160 to the first gate electrode G1. The second channel pattern C2 is correspondingly formed on the first insulating layer 160 to the second gate electrode G2. The first and second channel patterns C1 and C2 may be connected to each other, but alternatively may be separate from each other.

The first and second source electrodes S1 and S2 are formed by protrusions from the data line 120 along the first direction by a predetermined distance. The first source electrode S1 is formed on the second insulating layer 180 and partially overlaps the first channel pattern C1. For example, the first source electrode S1 has a U-shape as viewed in the plan view of FIG. 5. The second source electrode S2 is formed on the second insulating layer 180 and partially overlaps the second channel pattern C2. For example, the second source electrode S2 has the U-shape as viewed in FIG. 5. The first and second source electrodes S1 and S2 are electrically connected to each other.

The first drain electrode D1 is formed on the second insulating layer 180 and partially overlaps with the first channel pattern C1, and is separated from the first source electrode S1 by a predetermined distance. The first drain electrode D1 extends a predetermined length, so that it partially overlaps the first pixel electrode HP.

The second drain electrode D2 is formed on the second insulating layer 180 and partially overlaps the second channel pattern C2, and is separated from the second source electrode S2 by a predetermined distance. The second drain electrode D2 extends a predetermined length, so that is partially overlaps with the second pixel electrode LP.

The first and second drain electrodes D1 and D2 are electrically separate from each other. The first and second gate electrodes G1 and G2 are electrically connected to each other, and the first and second source electrodes S1 and S2 are also electrically connected to each other. However, as pointed out above, the first and second drain electrodes D1 and D2 are electrically separated from each other.

The first pixel electrode HP is electrically connected to a portion of the first drain electrode D1 through a first pixel contact hole PCH1 formed in the second insulating layer 180. The second pixel electrode LP is electrically connected to a portion of the second drain electrode D2 through a second pixel contact hole PCH2 formed at the second insulating layer 180.

The first and second pixel electrodes HP and LP are separate from each other. For example, the area of the second pixel electrode LP is larger than that of the first pixel electrode HP, and for example, the area of the second pixel electrode LP is twice as large as that of the first pixel electrode HP.

The first storage branch line 172 is formed along the first direction substantially parallel with the data line 120, so that it overlaps the first pixel electrode HP and the second pixel electrode LP. The first storage branch line 172 is formed between adjacent data lines 120. The first storage branch line 172 may be formed in the center of the region between the adjacent data lines 120.

The storage branch line 170 overlaps the first pixel electrode HP in a first overlapping area OA1, and overlaps the second pixel electrode LP in a second overlapping area OA2. An area of the first overlapping area OA1 is different from an area of the second overlapping area OA2. For example, the area of the first overlapping area OA1 is larger than that of the second overlapping area OA2, and the area of the first overlapping are OA1 may be twice as large as that of the second overlapping area OA2.

A first width W1 of the first storage branch line 172 which overlaps the first pixel electrode HP may be larger than a second width W2 of first storage branch line 172 which overlaps the second pixel electrode LP.

Figure 6:
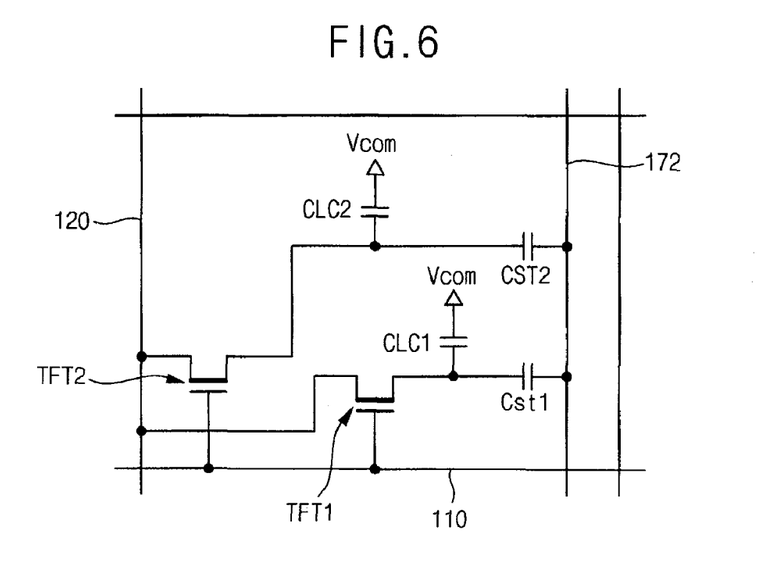
FIG. 6 is a schematic circuit diagram illustrating an electrical connection of the unit pixel in FIG. 5.

FIG. 6 is a schematic circuit diagram illustrating an electrical connection of the unit pixel in FIG. 5.

Referring to FIG. 6, the electrical connection in the unit pixel is explained below.

Firstly, the gate and data lines 110 and 120, respectively, are arranged substantially perpendicular to each other.

The gate electrode of the first TFT TFT1 is electrically connected to the gate line 110, and the source electrode of the first TFT TFT1 is electrically connected to the data line 120. The gate electrode of the second TFT TFT2 is electrically connected to the gate line 110, and the source electrode of the second TFT TFT2 is electrically connected to the data line 120. Thus, the gate electrode of the first TFT TFT1 is electrically connected to the gate electrode of the second TFT TFT2, and the source electrode of the first TFT TFT1 is electrically connected to the source electrode of the second TFT TFT2.

The drain electrode of the first TFT TFT1 is electrically connected to the first pixel electrode HP. In this case, a first liquid crystal capacitor CLC1 is defined between the first pixel electrode HP and the common electrode Vcom of the counter substrate 200, and a first storage capacitor CST1 is defined between the first pixel electrode HP and the first storage branch line 172.

The drain electrode of the second TFT TFT2 is electrically connected to the second pixel electrode LP. In this case, a second liquid crystal capacitor CLC2 is defined between the second pixel electrode LP and the common electrode Vcom of the counter substrate 200, and a second storage capacitor CST2 is defined between the second pixel electrode LP and the first storage branch line 172.

Figure 7:
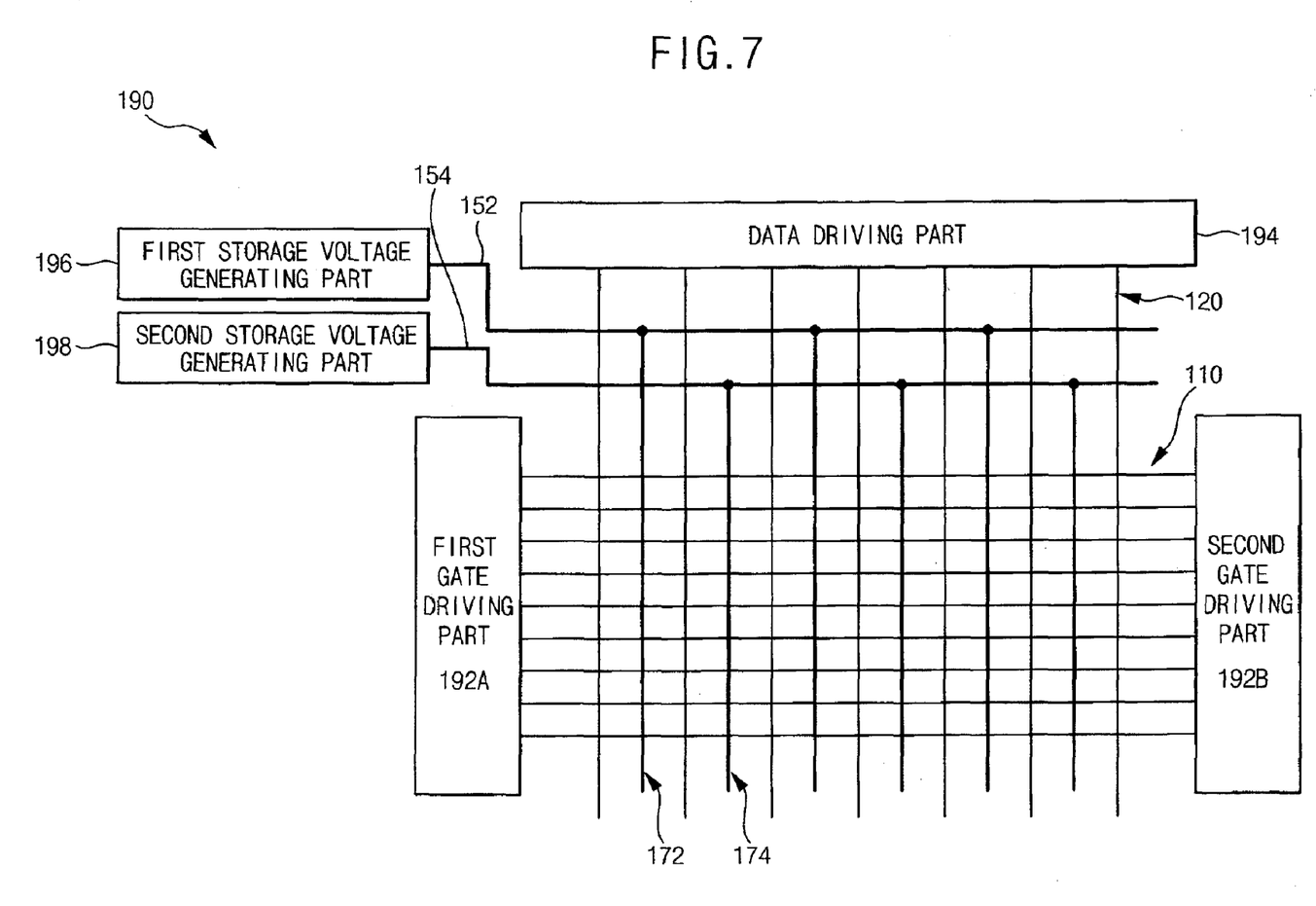
FIG. 7 is a plan view illustrating an electrical connection of the display apparatus in FIG. 1.

FIG. 7 is a plan view illustrating an electrical connection of the display apparatus in FIG. 1.

Referring to FIG. 7, the electrical connection of the display apparatus according to the present example embodiment is explained below.

The display apparatus according to the present example embodiment includes the gate lines 110, the data lines 120, the first storage main line 152, the second storage main line 154, the first storage branch line 172, the second storage branch line 174 and a driving unit 190. In this case, the driving unit 190 includes a gate driving unit 192, a data driving unit 194, a first storage voltage generating part 196 and a second storage voltage generating part 198.

The plurality of gate and data lines 110 and 120 cross each other, so that the plurality of unit pixels is defined.

For example, the first and second storage main lines 152 and 154 are separated from the gate line 110, and are formed at an upper side of the gate line 110. The first and second storage main lines 152 and 154 are separated from each other, and are formed parallel with the gate line 110.

The first and second storage branch lines 172 and 174 are formed between adjacent data lines 120. The first and second branch storage lines 172 and 174 may be formed in the center region of a pixel between the adjacent data lines 120.

The first storage branch line 172 crosses the unit pixels formed in the odd-numbered rows. As explained above, the end portion of the first storage branch line 172 is electrically connected to the first storage main line 152.

The second storage branch line 174 crosses the unit pixels formed in the even-numbered rows. The end portion of the second storage branch line 174 is electrically connected to the second storage main line 154.

The gate driving part 192 is electrically connected to the gate line 110, and applies the gate signal to the gate line 110. For example, the gate driving part 192 may include first gate driving part 192A and second gate driving part 192B. The first gate driving part 192A is electrically connected to left end portions of the gate lines in the odd-numbered rows, and second gate driving part 192B is electrically connected to the right end portions of the gate lines in the even-numbered rows.

The data driving part 194 is electrically connected to the data lines 120, and applies the data signal to the data lines 120. For example, the data driving part 194 is formed at an upper side of the first and second storage branch lines 172 and 174.

The first storage voltage generating part 196 is electrically connected to the first storage main line 152. The first storage voltage generating part 196 generates a first storage voltage, and applies the first storage voltage to the first storage main line 152. Thus, the first storage voltage passes through the first storage main line 152, and is applied to the first storage branch line 172.

The second storage voltage generating part 198 is electrically connected to the second storage main line 154. The second storage voltage generating part 198 generates a second storage voltage, and applies the second storage voltage to the second storage main line 154. Thus, the second storage voltage passes through the second storage main line 154, and is applied to the second storage branch line 174.

Figure 8:
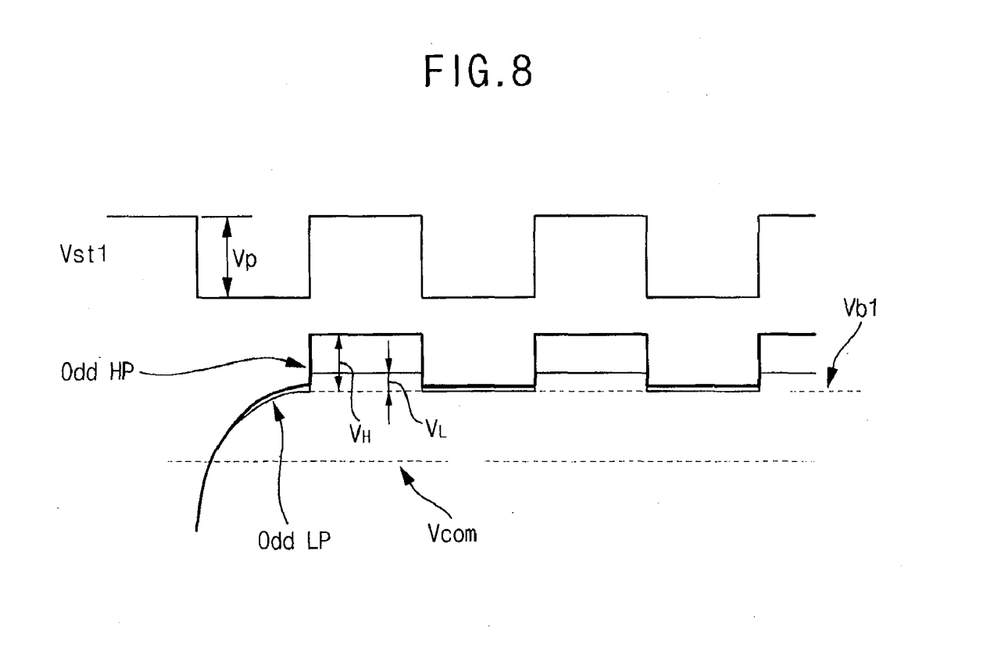
FIG. 8 is a waveform diagram illustrating voltages of first and second pixel electrodes according to a first storage voltage in FIG. 7.

FIG. 8 is a waveform diagram illustrating voltages of first and second pixel electrodes according to a first storage voltage in FIG. 7.

Referring to FIGS. 7 and 8, the voltages of the first and second pixel electrodes HP and LP according to the first storage voltage Vst1 is explained below.

Firstly, the first storage voltage Vst1 is a rectangular wave vibrating with predetermined amplitude. For example, the amplitude Vp of the first storage voltage Vst1 is in a range between about 3 V to about 7 V. The amplitude Vp may be about 5 V.

For example, the first pixel electrode HP and the second pixel electrode LP overlapped with the first storage main line 152 receives a positive (+) voltage on the basis of the common voltage Vcom. When the first storage voltage Vst1 is about 0 V like the common voltage Vcom, the voltages of the first and second pixel electrodes HP and LP have a first reference voltage Vb1. For example, the first reference voltage Vb1 is about 2 V.

However, when the first storage voltage Vst1 is the rectangular wave vibrating with predetermined amplitude as in the present example embodiment, the voltages of the first and second electrodes HP and LP are changed by the first storage voltage Vst1.

For example, when the first storage voltage Vst1 has a high voltage, the voltage of the first pixel electrode HP increases up to a first variation voltage VH, and the voltage of the second pixel electrode LP increases up to a second variation voltage VL. However, when the first storage voltage Vst1 has a low voltage, the voltages of the first and second pixel electrodes HP and LP are almost the same as the first reference voltage Vb1.

Referring to FIG. 5 again, the area of the first overlapping area OA1 between the storage branch line 170 and the first pixel electrode HP is larger than that of the second overlapping area OA2 between the storage branch line 170 and the second pixel electrode LP. When the area of the first overlapping area OA1 is larger than that of the second overlapping area OA2, the first variation voltage VH is larger than the second variation voltage VL. For example, when the area of the first overlapping area OA1 is twice as large as that of the second overlapping area OA2, the first variation voltage VH is twice as large as the second variation voltage VL. Thus, the voltage of the first pixel electrode HP is larger than the voltage of the second pixel electrode LP.

Figure 9:
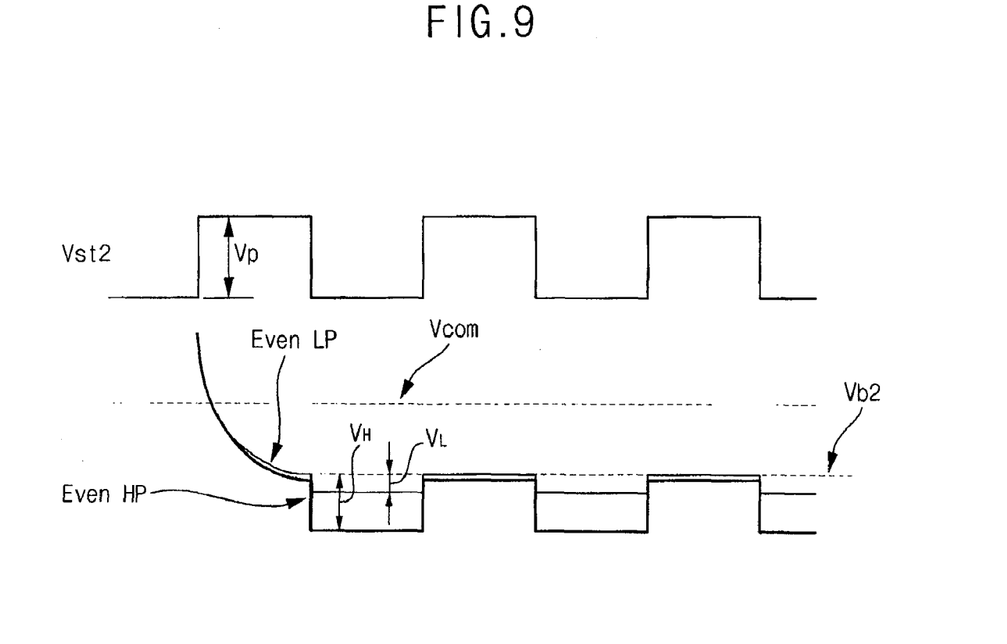
FIG. 9 is a waveform diagram illustrating voltages of the first and second pixel electrodes according to a second storage voltage in FIG. 7.

FIG. 9 is a waveform diagram illustrating voltages of the first and second pixel electrodes according to a second storage voltage in FIG. 7.

Referring to FIGS. 7, 8 and 9, the voltages of the first and second pixel electrodes HP and LP according to the second storage voltage Vst2 will be explained below.

Firstly, the second storage voltage Vst2 is the rectangular wave vibrating with predetermined amplitude. In this case, the second storage voltage Vst2 is the rectangular wave that has the same amplitude and a reversed phase as the first storage voltage Vst1.

The first pixel electrode HP and the second pixel electrode LP overlapped with the second storage main line 154 receives a negative (−) voltage on the basis of the common voltage Vcom. When the second storage voltage Vst2 is about 0 V like the common voltage Vcom, the voltages of the first and second pixel electrodes HP and LP have a second reference voltage Vb2. For example, the second reference voltage Vb2 is about −2 V.

However, when the second storage voltage Vst2 is the rectangular wave vibrating with predetermined amplitude as in the present example embodiment, the voltages of the first and second electrodes HP and LP are changed by the second storage voltage Vst2.

For example, when the second storage voltage Vst2 has a low voltage, the voltage of the first pixel electrode HP decreases down to the first variation voltage VH, and the voltage of the second pixel electrode LP decreases down to the second variation voltage VL. However, when the second storage voltage Vst2 has a high voltage, the voltages of the first and second pixel electrodes HP and LP are almost the same as the second reference voltage Vb2.

Referring to FIG. 5 again, since the area of the first overlapping area OA1 is larger than that of the second overlapping area OA2, the first variation voltage VH is larger than the second variation voltage VL. For example, when the area of the first overlapping area OA1 is twice as large as that of the second overlapping area OA2, the first variation voltage VH is twice as large as the second variation voltage VL. Thus, the voltage of the first pixel electrode HP is smaller than the voltage of the second pixel electrode LP.

Referring to FIG. 6 again, the first variation voltage VH is determined by the amplitude Vp of the first storage voltage Vst1, the first liquid crystal capacitor CLC1 and the first storage capacitor CST1. For example, the first variation voltage is determined by Equation 1.

$$V_H = V_p * \{CST1/(CST1+CLC1)\} \quad \text{Equation 1}$$

Thus, when the amplitude Vp of the first storage voltage Vst1 is 5 V, the first liquid crystal capacitor CLC1 is 1 pF and the first storage capacitor CST1 is 4 pF, the first variation voltage VH is 4 V.

In addition, the second variation voltage VL is determined by the amplitude Vp of the second storage voltage Vst2, the second liquid crystal capacitor CLC2 and the second storage capacitor CST2. For example, the second variation voltage is determined by Equation 2.

$$V_L = V_p * \{CST2/(CST2+CLC2)\} \quad \text{Equation 2}$$

Thus, when the amplitude Vp of the second storage voltage Vst2 is 5 V, the second liquid crystal capacitor CLC2 is 2 pF and the second storage capacitor CST2 is 2 pF, the second variation voltage VL is 2.5 V.

Since the area of the second pixel electrode LP is twice as large as that of the first pixel electrode HP, the first liquid crystal capacitor CLC1 is 1 pF and the second liquid crystal capacitor CLC2 is 2 pF.

In addition, since the area of the first overlapping area OA1 is twice as large as that of the second overlapping area OA2, the first storage capacitor CST1 is 4 pF and the second storage capacitor CST2 is 2 pF.

According to the present example embodiment, the storage branch line 170 is overlapped with the first and second pixel electrodes HP and LP that are separated from each other, having different areas, so that the first storage capacitor CST1 and the second storage capacitor CST2 are different from each other.

Therefore, although the same driving voltage is applied to the first and second pixel electrodes HP and LP, the voltage of the first pixel electrode HP is different from the voltage of the second pixel electrode LP due to the difference between the first and second capacitors CST1 and CST2.

Thus, when the voltage of the first pixel electrode HP is different from the voltage of the second pixel electrode LP, a viewing angle of the display apparatus 600 may be enhanced.

According to the present invention, the storage main line is overlapped with the first and second pixel electrodes that are separated from each other, having different areas, so that the first storage capacitor is different from the second storage capacitor and the different voltages are applied to the first and second pixel electrodes. Thus, the viewing angle may be more enhanced.

Having described the example embodiments of the present invention and its advantage, it is noted that various changes, substitutions and alterations can be made herein without departing from the spirit and scope of the invention as defined by appended claims.

What is claimed is:

1. An array substrate comprising:
 a first thin-film transistor (TFT) electrically connected to a gate line and a data line;
 a second TFT electrically connected to the gate line and the data line;
 a first pixel electrode electrically connected to the first TFT;
 a second pixel electrode electrically connected to the second TFT; and
 a storage line positioned in an overlapping relationship with the first and second pixel electrodes, wherein the overlap defines a first area of the storage line associated with the first pixel electrode, and a second area of the storage line associated with the second pixel electrode, and further wherein a magnitude of the first area is different from a magnitude of the second area;

wherein the storage line crosses with the gate line, wherein the gate line is one of a plurality of gate lines formed in the array substrate and extending along a first direction, the data line is one of a plurality of data lines formed in the array substrate and extending along a second, different direction from the first direction thereby forming a plurality of unit pixels, and wherein the first pixel electrode is one of a plurality of first pixel electrodes formed in the array substrate, the second pixel electrode is one of a plurality of second pixel electrodes formed in the array substrate, each unit pixel comprising a respective one of the first pixel electrodes and a respective one of the second pixel electrodes, wherein:

the unit pixels comprise a plurality of columns of unit pixels, the columns comprising even-numbered columns and odd-numbered columns; and the storage line is one of a plurality of storage lines formed in the array substrate, the plurality of storage lines comprising a plurality of first storage lines and a plurality of second storage lines;

each first storage line overlaps the first and second pixel electrodes that are disposed in a respective one of the odd-numbered columns of the unit pixels; and each second storage line overlaps the first and second pixel electrodes that are disposed in a respective one of the even-numbered columns of the unit pixels.

2. The array substrate of claim 1, wherein a gate electrode and a source electrode of the first TFT are electrically connected to a gate electrode and a source electrode of the second TFT, respectively.

3. The array substrate of claim 1, wherein the magnitude of the first area is larger than the magnitude of the second area.

4. The array substrate of claim 3, wherein the first area is twice as large as the second area.

5. The array substrate of claim 3, wherein a width of the storage line overlapping the first pixel electrode is larger than a width of the storage line overlapping the second pixel electrode.

6. The array substrate of claim 1, wherein the second pixel electrode is shaped such that it surrounds at least a portion of the first pixel electrode.

7. The array substrate of claim 1, wherein an area of the second pixel electrode is twice as large as an area of the first pixel electrode.

8. The array substrate of claim 1, further comprising a first storage voltage generator coupled to the first storage lines, and a second storage voltage generator coupled to the second storage lines.

9. The array substrate of claim 8, further comprising:

a first storage main line electrically connected to an end portion of each first storage line; and a second storage main line electrically connected to an end portion of each second storage line, wherein a first storage voltage generator is coupled to the first storage main line and a second storage voltage generator is coupled to the second storage main line.

10. The array substrate of claim 9, wherein the first and second storage main lines are formed from the same layer as the gate lines.

11. The array substrate of claim 10, wherein the first and second storage main lines are formed along a direction parallel with the gate lines.

12. The array substrate of claim 10, wherein a first insulating layer is formed on the first and second storage main lines, the first and second storage lines are formed on the first insulating layer, and a second insulating layer is formed on the first and second storage lines.

13. The array substrate of claim 12, wherein:

for each first storage line, a first contact hole is formed in the second insulating layer for exposing the end portion of the first storage line, for each first storage line, a second contact hole is formed in the first and second insulating layers for exposing a portion of the first storage main line, for each second storage line, a third contact hole is formed in the second insulating layer for exposing the end portion of the second storage line, and for each second storage line, a fourth contact hole is formed in the first and second insulating layers for exposing a portion of the second storage main line.

14. The array substrate of claim 13, further comprising:

for each first storage line, a first connecting electrode formed on the second insulating layer and electrically connected to the first storage line through the corresponding first contact hole and to the first storage main line through the corresponding second contact hole; and for each second storage line, a second connecting electrode formed on the second insulating layer and electrically connected to the second storage line through the corresponding third contact hole and to the second storage main line through the corresponding fourth contact hole.

15. The array substrate of claim 14, wherein the first and second connecting electrodes are formed from the same layer as the first and second pixel electrodes and include a transparent conductive material.

16. The array substrate of claim 1, wherein each unit pixel has a rectangular shape with a relatively longer side extending along the first direction.

17. The array substrate of claim 16, wherein in each column, the alternate pixel units are connected by the respective first and second TFTs to one of the data lines, and the remaining pixel units are connected by the respective first and second TFTs to another one of the data lines.

18. The array substrate of claim 1, wherein each storage line extends through a center of a region between respective adjacent two of the data lines.

19. A display apparatus having an array substrate, a counter substrate facing the array substrate, a liquid crystal layer disposed between the array substrate and the counter substrate, and a driving unit electrically connected to the array substrate, the array substrate comprising:

a first TFT electrically connected to a gate line and a data line crossing each other;

a second TFT electrically connected to the gate line and the data line;

a first pixel electrode electrically connected to the first TFT;

a second pixel electrode electrically connected to the second TFT; and a storage line positioned in an overlapping relationship with the first and second pixel electrodes, wherein the overlap defines a first area of the storage line associated with the first pixel electrode, and a second area of the storage line associated with the second pixel electrode, and further wherein a magnitude of the first area is different from a magnitude of the second area;

wherein the storage line crosses with the gate line, wherein the gate line is one of a plurality of gate lines formed in the array substrate and extending along a first direction, the data line is one of a plurality of data lines formed in the array substrate and extending along a second, different direction from the first direction thereby forming a plurality of unit pixels, and wherein the first pixel electrode is one of a plurality of first pixel electrodes formed in the array substrate, the second pixel electrode is one of a plurality of second pixel electrodes formed in the array substrate, each unit pixel comprising a respective one of the first pixel electrodes and a respective one of the second pixel electrodes, wherein:

the unit pixels comprise a plurality of columns of unit pixels, the columns comprising even-numbered columns and odd-numbered columns; and the storage line is one of a plurality of storage lines, the plurality of storage lines comprising a plurality of first storage lines and a plurality of second storage lines;

each first storage line overlaps the first and second pixel electrodes that are disposed in a respective one of the odd-numbered columns of the unit pixels; and each second storage line overlaps the first and second pixel electrodes that are disposed in a respective one of the even-numbered columns of the unit pixels.

20. The display apparatus of claim 19, wherein the array substrate further comprises:

a first storage main line electrically connected to an end portion of each first storage line; and a second storage main line electrically connected to an end portion of each second storage line, wherein a first storage voltage generator is coupled to the first storage main line and a second storage voltage generator is coupled to the second storage main line.

21. The display apparatus of claim 20, wherein:

the first storage voltage generator is for generating a first storage voltage and applying the first storage voltage to the first storage main line; and the second storage voltage generator is for generating a second storage voltage different from the first storage voltage and applying the second storage voltage to the second storage main line.

22. The display apparatus of claim 21, wherein the first and second storage voltages comprise rectangular waves that vibrate with predetermined amplitude.

23. The display apparatus of claim 22, wherein the first and second storage voltages comprise the rectangular waves that have the same amplitude but have reversed phases.

24. The display apparatus of claim 19, wherein each storage line extends through a center of a region between respective adjacent two of the data lines.

* * * * *